(12) United States Patent
Hwang et al.

(10) Patent No.: US 6,725,054 B1
(45) Date of Patent: Apr. 20, 2004

(54) APPARATUS AND METHOD OF CONTROLLING FORWARD LINK POWER WHEN IN DISCONTINUOUS TRANSMISSION MODE IN A MOBILE COMMUNICATION SYSTEM

(75) Inventors: Jong-Yoon Hwang, Songnam-shi (KR); Hi-Chan Moon, Seoul (KR); Jong-Han Kim, Yongin-shi (KR); Jin-Soo Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 452 days.

(21) Appl. No.: 09/606,810

(22) Filed: Jun. 28, 2000

(30) Foreign Application Priority Data

Jun. 28, 1999 (KR) ........................................ 1999-25052
Jul. 8, 1999 (KR) ........................................ 1999-27390

(51) Int. Cl.$^7$ ............................... H04B 7/00; H04Q 7/20
(52) U.S. Cl. ..................... 455/522; 455/436; 455/517; 370/317; 370/318
(58) Field of Search ..................... 455/522, 422.1, 455/436, 437, 438, 517, 127.1; 370/318, 310, 317, 310.2

(56) References Cited

U.S. PATENT DOCUMENTS

| | | | |
|---|---|---|---|
| 5,461,639 A | * 10/1995 | Wheatley et al. | 370/342 |
| 5,559,804 A | * 9/1996 | Amada et al. | 370/347 |
| 6,058,107 A | * 5/2000 | Love et al. | 370/332 |
| 6,181,738 B1 | * 1/2001 | Chheda et al. | 375/224 |
| 6,212,364 B1 | * 4/2001 | Park | 455/69 |
| 6,233,439 B1 | * 5/2001 | Jalali | 455/127 |
| 6,396,867 B1 | * 5/2002 | Tiedemann et al. | 375/141 |
| 6,445,930 B1 | * 9/2002 | Bartelme et al. | 455/522 |

FOREIGN PATENT DOCUMENTS

| | | |
|---|---|---|
| EP | 0 682 418 | 11/1995 |
| WO | WO 98 36508 | 8/1998 |
| WO | WO 98 49785 | 11/1998 |
| WO | WO 99/16264 | 4/1999 |
| WO | WO 99 29048 | 6/1999 |

OTHER PUBLICATIONS

European Search Report dated May 3, 2002 issued in EP Appln. No. 00940975.6.
Alfred Baier et al., "Design Study for a CDMA–Based Third–Generation Mobile Radio System", IEEE Journal on Selected Areas in Communications, vol. 12, No. 4, May 1994.

\* cited by examiner

*Primary Examiner*—William Trost
*Assistant Examiner*—Stephen D'Agosta
(74) *Attorney, Agent, or Firm*—Dilworth & Barrese, LLP

(57) ABSTRACT

An apparatus and method of detecting whether data exists in a received signal while a mobile communication terminal is in discontinuous transmission mode is disclosed. The apparatus and method comprises generating and transmitting a forward power control command for providing the forward power control, and performing forward power control in a mobile communication system. According to the forward power control method, a power control command is generated based on a received frame including a plurality of slots each of which includes power control bits. The ratio of the power control bit energy to noise energy, which is given by a ratio of the accumulated energy of the power control bits in the slots of the received frame to an accumulated energy value of noise in the slots of the received frame, is provided, and the power control command based on a ratio of the accumulated energy value of traffic symbol bits in the slots to the accumulated energy value of the power control bits is generated when the provided ratio of the power control bits to noise is acceptable.

11 Claims, 11 Drawing Sheets

APPARATUS AND METHOD OF CONTROLLING FORWARD LINK POWER WHEN IN DISCONTINUOUS TRANSMISSION MODE IN A MOBILE COMMUNICATION SYSTEM

PRIORITY

This application claims priority to applications entitled "Apparatus and Method of Controlling Forward Link Power When in Discontinuous Transmission Mode in a Mobile Communication System" filed in the Korean Industrial Property Office (KIPO) on Jul. 8, 1999 and assigned Ser. No. 99-27390, and "Apparatus and Method for Detecting Frame of Discontinuous Transmission Mode Mobile Communication System" filed in the KIPO on Jun. 28, 1999 and assigned Ser. No. 99-25052, the contents of which are hereby incorporated by reference.

BACKGROUND OF THE INVENTION

1. Field of the Invention

The present invention relates to an apparatus and method of controlling a power in a mobile communication system, and more particularly to an apparatus and method of controlling forward link power while in discontinuous transmission mode.

2. Description of the Related Art

Typically, discontinuous transmission mode (DTX) is a mode that transmits data in a frame unit only when there is data to be transmitted in a wired system or a mobile communication system. Discontinuous transmission mode is used for the following advantages. Since data frames are transmitted only when data actually exists, transmission power can be minimized, and the strength of the interference signal affecting the system is reduced, so that the capacity of the whole system is increased.

However, since the transmitter discontinuously transmits frames, the receiver cannot recognize whether a frame is transmitted, and this causes a base station not to be able to perform forward link power control by itself. Specifically, when the receiver of a terminal cannot accurately judge whether a frame is transmitted, the receiver of the terminal cannot trust judgment variables of a decoder including a cyclic redundancy code (CRC) and so on, and the result of decoding decision of its decoder. Since the result of judgment cannot be trusted, the existing method used in continuous transmission mode cannot accurately control the transmission power of the base station when in discontinuous transmission mode. Hereinafter, an example of the conventional forward link power control method performed in the receiver of the discontinuous transmission mode mobile radio communication system will be explained.

FIG. 1 is a block diagram of the conventional forward link power control apparatus of the receiver and the transmitter in the discontinuous transmission mode mobile communication system. Here, it is assumed that the mobile communication system is a code division multiple access (CDMA) communication system.

Referring to FIG. 1, a radio frequency (RF) section 10 converts an RF signal received through an antenna ANT into a baseband frequency by frequency-down-converting the RF signal. A receiver 12 despreads the output signal of the RF section 10, and determines the level of a symbol by accumulating the despread signals in a symbol unit. At this time, the despreading includes PN despreading and orthogonal despreading. A decoder 14 of the receiver checks whether the received frame is in a good state or in an erasure state by checking the received frame thereby checking the condition of the channel. A control section 16 transmits the result of checking from the decoder 14 backward to the base station. When the result of channel checking, which is transmitted backward to a power control section (not illustrated in FIG. 1) of the base station, is in a good state, the power control section judges that the channel is in a good state, and reduces the forward transmission power. On the other hand, when the result of channel checking is in an erasure state, the judgment of the power control section depends on whether the base station had transmitted a prior frame. If the base station had transmitted a prior frame, the power control section judges that the channel is in an erasure state, and increases the forward transmission power, while if the base station has not transmitted a prior frame, the power control section ignores the result and thus does not reflect the command in the forward link power control.

Accordingly, when in discontinuous transmission mode, the conventional forward link power control method has the drawback that the forward link power control command that is transmitted backward is used only when the transmitted data frame exists, the speed at which the forward link power control is adjusted becomes greatly lowered. In other words, when in discontinuous transmission mode where the amount of transmitted data is very small, power control is performed at a very low speed that is much less than the power control speed of 50 Hz in continuous transmission mode, and thus the forward link power control cannot follow the speed of the channel change. As a result, an apparatus and method of more rapidly and accurately controlling the forward link power when in discontinuous transmission mode are needed.

SUMMARY OF THE INVENTION

An object of the present invention is to provide an apparatus and method of controlling link power based on an accurate judgment of channel state by a terminal in a mobile communication system when in discontinuous transmission mode.

It is another object of the present invention to provide an apparatus and method of controlling a link power using channel state information received from a terminal in a mobile communication system when in discontinuous transmission mode.

In order to achieve the above and other objects, according to one aspect of the present invention, there is provided an apparatus for discriminating the existence or nonexistence of discontinuous transmission mode data while in discontinuous transmission mode. The apparatus comprises a location detector for detecting the location of energy of power control bits and the location of energy of non-power control bits in received data, a first energy measuring device for measuring the energy of a signal corresponding to the location of the non-power control bits outputted from the location detector, a second energy measuring device for measuring the energy of a signal corresponding to the location of the power control bits outputted from the location detector, and a control section for discriminating the existence or nonexistence of data by calculating an output ratio of the first energy measuring device to the second energy measuring device.

The data existence or nonexistence discriminating apparatus according to the present invention further comprises a decoder for detecting a CRC state in case that the transmitted data includes a CRC, wherein the control section discriminates the existence or nonexistence of the data along with the CRC state value.

The control section comprises an energy ratio calculator for calculating a ratio of the energy value of the first energy measuring device to the energy value of the second energy measuring device, a first comparator for comparing the output of the energy ratio calculator with a predetermined threshold value according to the existence/nonexistence of the data, and a controller for detecting the existence or nonexistence of data according to the output of the first comparator.

The data existence/nonexistence discriminating apparatus according to the present invention further comprises a second comparator for comparing the accumulated energy value of the power control bits with a minimum threshold value when data exists, wherein the control section discriminates the existence or nonexistence of data using the above outputs and an output of the second comparator.

The data existence/nonexistence discriminating apparatus according to the present invention further comprises a transmitter for transmitting the signals as described above to a base station in the mobile communication system.

The transmitter comprises a channel information inserter for transmitting the detected data state information as a power control command, a multiplexer for multiplexing the data outputted from the channel information inserter and reverse pilot channels, and a reverse transmitter for converting and transmitting an output of the multiplexer as a transmission signal.

The transmitted power control command may be composed of one-bit information representing 'sufficient' and 'insufficient', or may be composed of two-bit information representing 'good', 'uncertain', 'pass', and 'bad'.

In another aspect of the present invention, there is provided an apparatus for controlling forward link power according to a power control command included in received discontinuous transmission mode data while in discontinuous transmission mode. The apparatus comprises a power control command demodulator for extracting the power control command from the received data in order to provide the power control command, a controller for combining demodulated information and information representing whether a previous frame has been transmitted, and for generating and outputting power control bits for reducing the power only when the two information coincide, and a forward transmitter for transmitting the data and the power control bits under the control of the controller.

In still another aspect of the present invention, there is provided a method of generating a power control command based on a received frame that includes a plurality of slots, each of which includes power control bits. The method comprises the steps of providing the ratio of the power control bits to noise, which is given by the ratio of the energy accumulated value of the power control bits in the slots to the energy accumulated value of noise in the slots, and generating the power control command based on a ratio of the energy accumulated value of traffic symbol bits in the slots to the energy accumulated value of the power control bits when the provided ratio of noise power control bits is good.

A power control command generating method according to the present invention further comprises the steps of detecting CRC information if the frame includes CRC information, checking a decoded state of the detected CRC information, and generating a power control command for reducing power if decoding of the CRC information has been accurately performed.

A power control command generating method according to the present invention further comprises the step of generating a power control command for increasing power if decoding of the detected CRC information has not been accurately performed.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

Figure 1:
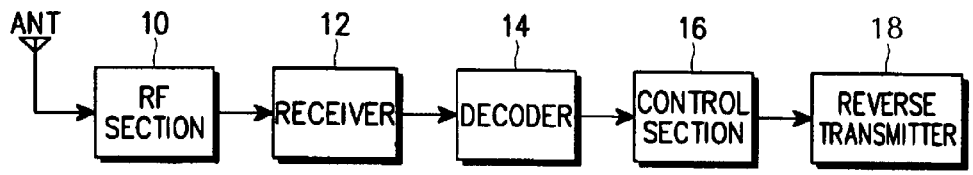
FIG. 1 is a block diagram illustrating the construction of the conventional apparatus for controlling a forward link power using a decoder in a mobile communication system capable of discontinuous transmission mode.

Reference will now be made in greater detail to the preferred embodiments of the present invention. In the drawings, the same elements are denoted by the same reference numerals even though they are depicted in different drawings.

In the following description of the present invention, many specific items, such as the number of continuous accumulated periods of power control bits (a uniformly transmitted portion) and non-power control bits (a portion that may be differently transmitted for each frame) for determining the existence or nonexistence of a frame, and so on are indicated, but they are provided only for the whole understanding of the present invention, and thus it will be understood by those skilled in the art that the present invention can be performed without such specified items or with modifications thereof. Hereinafter, the present invention will be explained, using an example where the uniformly transmitted portion is the power control bits of a forward link, and the portion that may be differently transmitted for each frame is the non-power control bits.

In the following description, the term "forward link" means a link transmitted from the base station to the terminal, and the term "reverse link" means a link transmitted from the terminal to the base station.

Figure 2:
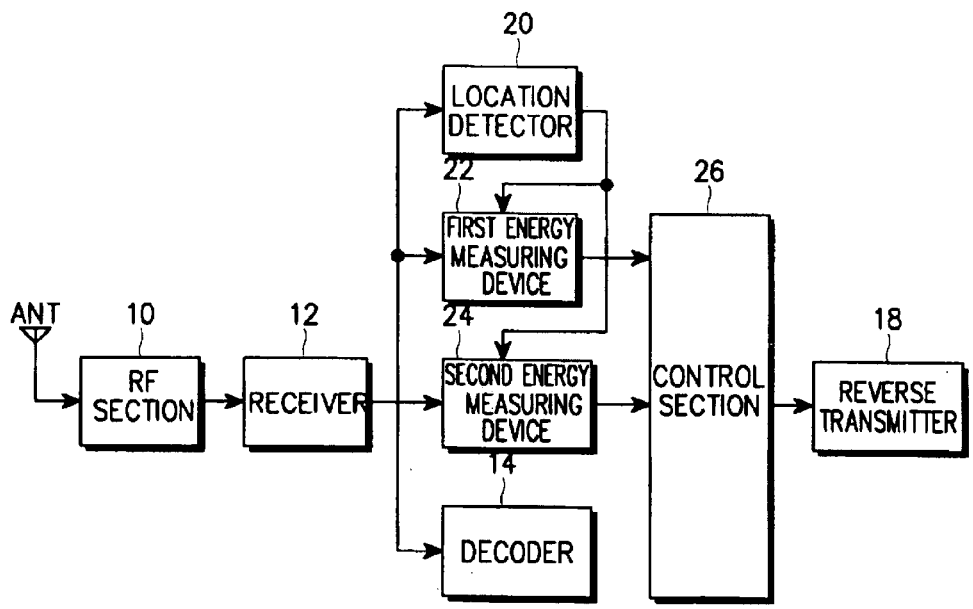
FIG. 2 is a block diagram illustrating the construction of an apparatus for controlling a forward link power by judging the state of a received frame while in discontinuous transmission mode in a mobile communication system according to an embodiment of the present invention.

FIG. 2 is a block diagram illustrating the construction of the communication apparatus of the receiver according to an embodiment of the present invention.

Referring to FIG. 2, a radio frequency (RF) section 10 converts an RF signal received through an antenna ANT into a baseband frequency by frequency-down-converting the RF signal. A receiver 12 despreads an output signal of the RF section 10, and outputs a value of a symbol by accumulating the despread signals in a symbol unit At this time, the despreading includes PN despreading and orthogonal despreading. A first energy measuring device 22 measures the non-power control bits, that is, measures and outputs the energy of the non-power control bits outputted from the receiver 12. A second energy measuring device 24 measures the power control bits, that is, measures and outputs the energy of the power control bits outputted from the receiver 12. A location detector 20 outputs a signal which designates the location of the non-power control bits according to the CDMA-2000 system or W-CDMA system to the first energy measuring device 22, generates and outputs to the second energy measuring device 24 a signal which designates the location of the power control bits. A control section 26 determines the state of the channel using outputs of the first and second energy measuring devices 22 and 24 and an output of a decoder 14. If the channel state is determined as above, the control section 26 transmits the channel state information to the base station through a reverse transmitter 18.

As described above, the forward link power control apparatus of FIG. 2 judges the channel state according to the existence of the frame by measuring the received signal, and controls the forward link power using the channel state in discontinuous transmission mode in a CDMA communication system. Here, the received signal is a user channel signal transmitted when in discontinuous transmission mode, and its frame is composed of power control bits and non-power control bits. Accordingly, the first energy measuring device 22 measures the non-power control bit energy, and the second energy measuring device 24 measures the power control bit energy.

The control section 26 calculates the strength ratio of measured non-power control energy to measured bit power control bit energy. Thereafter, the control section 26 determines whether a received frame exists using the strength ratio value and a predetermined threshold value, and judges the state of the received channel. The control section 26 of the terminal determines a forward power control command to be transmitted on the reverse link according to the result of the channel state judgment, and transmits the determined value on the reverse link. Accordingly, the base station controls the forward transmission power using the power control command transmitted on the reverse link. The mobile station transmits the result of the channel state judgment of the control section 26 on the reverse link to the base station. The base station uses this value as the control value for controlling the forward power control depending whether the previous frame has been transmitted or not.

Figure 3:
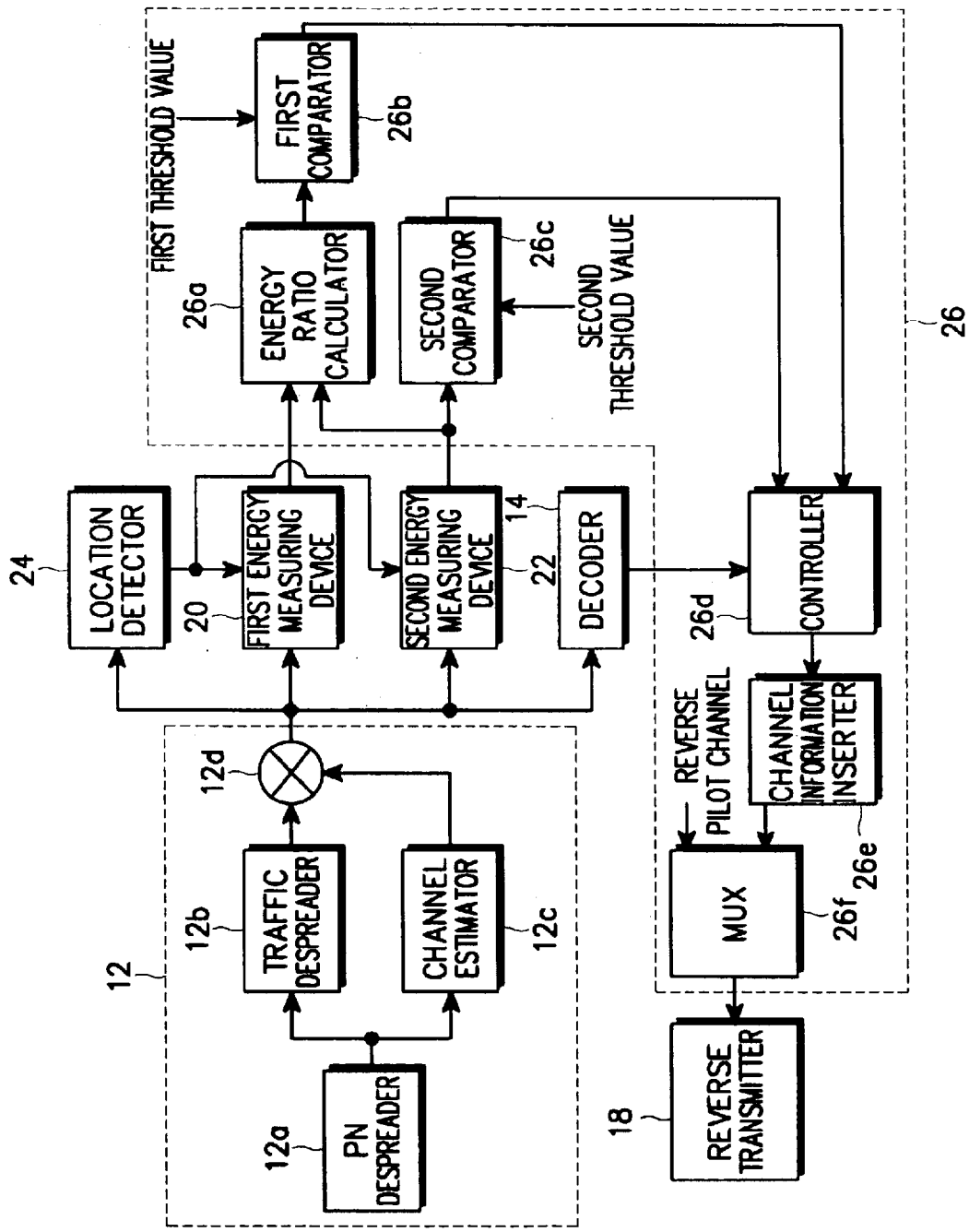
FIG. 3 is a block diagram illustrating the construction of a terminal which judges the state of a frame using information including information from the decoder of FIG. 2, according to an embodiment of the present invention.

FIG. 3 is a block diagram illustrating the construction of a terminal according to an embodiment of the present invention. The terminal judges the existence or nonexistence of the frame by obtaining the information from the decoder, and the ratio of the non-power control bit energy to the power control bit energy, and transmits the channel state information backward. Referring to FIG. 3, the construction and operation of an embodiment of the present invention will be explained in detail.

The receiver 12 as shown in FIGS. 1 and 2 comprises a PN despreader 12a, a traffic despreader 12b, a channel estimator 12c, and a mixer 12d, as shown in FIG. 3. The PN despreader 12a despreads the received signal of the forward link using a PN sequence. The traffic despreader 12b, which is an orthogonal despreader, despreads the PN-despread signal using the orthogonal code of the corresponding channel. Here, the orthogonal code may be a Walsh code, and the channel may be a user traffic channel. The channel estimator 12c receives the signal PN-despread by and outputted from the PN despreader 12a, and generates a channel estimation signal. The mixer 12d receives the output of the traffic despreader 12b and the output of the channel estimator 12c, mixes the received signals, and outputs the mixed signal.

A first energy measuring device 20 receives the orthogonal despread channel signal, i.e., the output of mixer 12d, accumulates the energy of the non-power control bits Non_PCB for a predetermined period N1, and then measures the energy of the non-power control bits for the accumulating period. A second energy measuring device 22 receives the output of the mixer 12d, accumulates the energy of the power control bits PCB for a predetermnined period N2, and then measures the energy of the power control bits for the accumulating period.

An energy ratio calculator 26a divides the output of the first energy detector 20 by the output of the second energy detector 22. The output of the energy ratio calculator 26a is input to a first comparator 26b. The first comparator 26b compares the input value with a first threshold value. An output value of the first comparator 26b will be a basis for judging the existence or nonexistence of a frame. The energy ratio calculator 26a, which obtains the ratio of the non-power control bit energy to the power control bit energy, may calculate the energy ratio for each power control group (PCG), and accumulate the ratio for a frame period. Also, the energy ratio calculator 26a may accumulate the power control bit energy and the non-power control bit energy, respectively, for a frame period, and obtain the ratio thereof once for each frame.

The first energy measuring device 20 and the second energy measuring device 22 can be used both in a system where the users use their own power control bit locations, respectively, and in a system where the users use a common power control bit location. Specifically, they can be used both in the CDMA-2000 system where the locations of the power control bits are determined using the codes of the respective users and in the W-CDMA system wherein the location of the transmit power control (TPC) bits is fixed for the users. A second comparator 26c is for judging the channel state using the power control bits which always exist in the situation where the existence or nonexistence of data is not known. The second comparator 26c compares the output of the second energy measuring device 22 with a predetermined second threshold value, and outputs a resulting signal of comparison.

Figure 14:
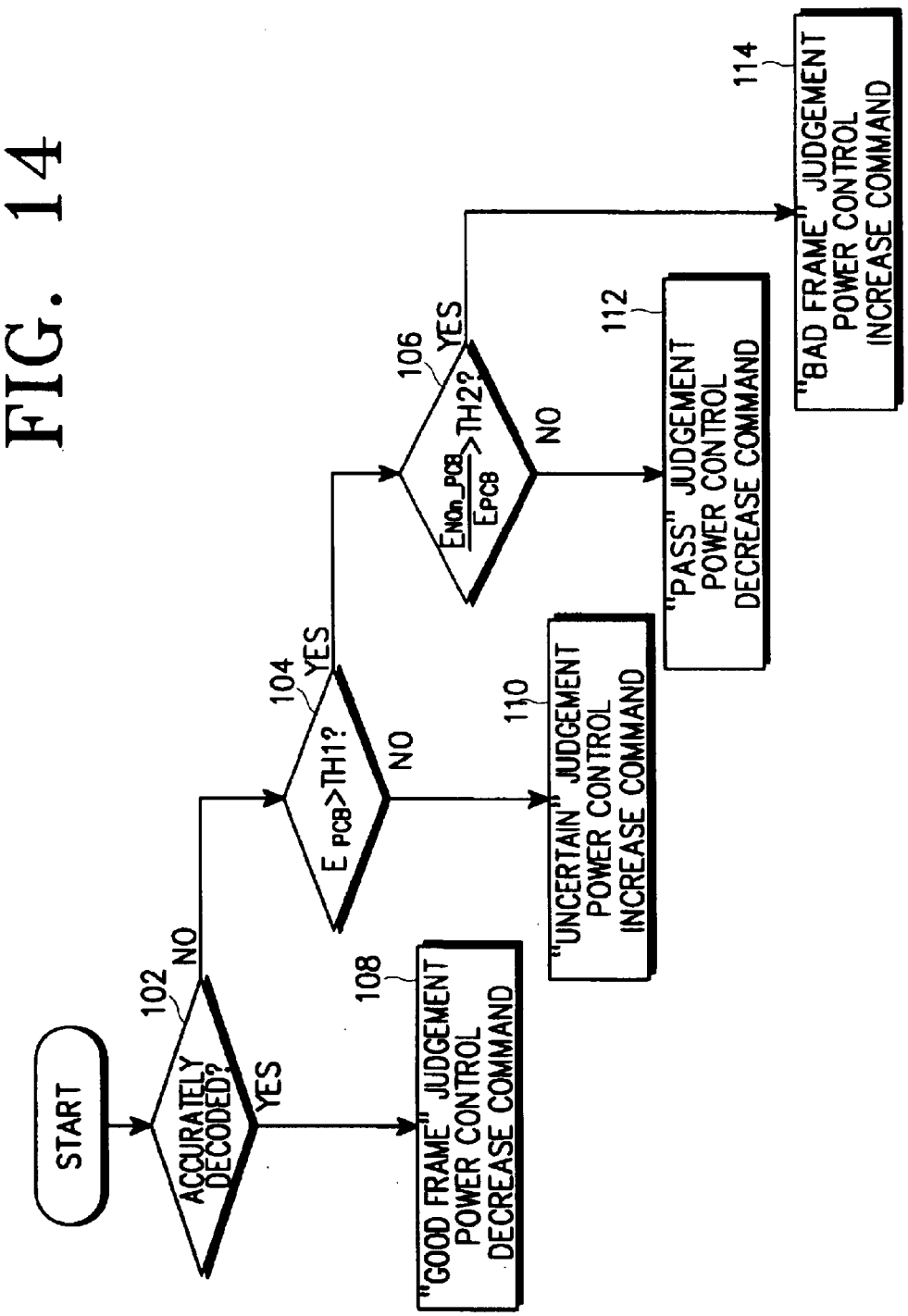
FIG. 14 is a flowchart explaining the operation of the controller according to the embodiment of the present invention of FIG. 3.

A controller 26d can judge the frame state using an output value of the first comparator 26b, an output value of the second comparator 26c and decoding state information output from the decoder 14. The decoding state information output from the decoder 14, which is used by controller 26d channel is in a pass state. The operation of the controller 26d will be explained later with reference to the flowchart of FIG. 14. By the operation of the controller 26d as illustrated in the flowchart of FIG. 14, the receiver can determine when the channel state is good, even when the result of the CRC checking is not good because there is no data frame. Thus, the receiver discriminates this case from the case where the data frame exists, but the channel state is bad. As a result, the channel state of the received signal can be accurately judged.

The CRC, which is the output of the decoder, power control bit energy, result of the possible channel judgment of the controller according to the ratio of the non-power control bit energy to the power control bit energy, and forward link power control commands for the respective cases are illustrated in Table 1 as below.

TABLE 1

| CRC | Good | | | | Bad | | | |
|---|---|---|---|---|---|---|---|---|
| Is PCB energy Larger than TH1? | Y | | N | | Y | | N | |
| Is ratio of Non_PCB energy to PCB energy larger than TH2? | Y | N | Y | N | Y | N | Y | N |
| Forward channel state | G | G | G | G | B | P | U | U |
| Quality of received signal | S | S | S | S | I | S | I | I |
| Reverse link transmission Forward power control command | Down | Down | Down | Down | Up | Down | Up | Up | for judging the state of the decoded frame, can use any one of a metric, an error rate of the coded symbol, a CRC, or a combination thereof. In this embodiment of the present invention, CRC bits exists in the data frame, and the receiver uses them to judge the reliability of the frame. However, a metric, an error rate of the coded symbol, etc., may be used instead. The present invention is not limited to the decoder methods used in the conventional art. If it is confirmed, as a result of the CRC checking by the decoder 14, that the received frame is a good frame, the controller 26d judges that there is a frame in the received signal, and the frame is in a good state. If it is confirmed that the received frame is not a good frame as a result of the CRC checking by the decoder 14, the controller 26d checks the output of second comparator 26c, which output is the result of comparing the energy value of the power control bits with the second threshold value. If the energy value does not exceed the second threshold value, the controller 26d judges that the frame is in an uncertain state. When a frame is judged as being in an uncertain state, it means that the energy of the power control bits, which are always transmitted, is below a specified level. That is, if the reliability for determining whether the data frame exists in the received signal is low, then it is judged that the channel state of the received signal is uncertain.

On the other hand, if the energy value of the power control bits exceeds the second threshold value, the controller 26d checks the output of the first comparator 26b, which is the result of comparing the ratio of the non-power control bit energy to the power control bit energy with the first threshold value. If it is determined that the value exceeds the first threshold value, the controller 26d judges that data exists in the frame, and the channel state is bad. If it is determined that the value does not exceed the first threshold value, the controller 26d judges that no frame exists in the received signal. Also, since the power control bit energy is over the specified level for a frame, the controller 26d judges that the In Table 1, "Y" denotes 'yes', and "N" denotes 'no' as a result of checking. "G" denotes a good state, "B" denotes a bad state, "P" denotes a pass state where no frame exists, and "U" denotes a uncertain state as result of frame judgment. Also, "S" denotes a sufficient quality of the received signal irrespective of the existence or nonexistence of data, and "I" denotes an insufficient quality of the received signal irrespective of the existence or nonexistence of data.

Specifically, in case of "G", it is judged that the data exists in the frame, and the frame has a sufficient quality. In case of "B", it is judged that the data exists in the frame, but the frame has an insufficient quality. In case of "P", it is judged that the channel state is good, but no data exists in the frame. In case of "U", it is judged that the channel state is uncertain. In case of "P", no data exists in the frame, but the power control bit value is over the specified value as a result of measuring the size of the power control bits that always exist in the frame. Thus the channel state is judged to have the sufficient quality. In case that the channel state is uncertain, the power control bit energy is below the specified value, and thus the channel state is judged to have the insufficient quality. On the lower part of Table 1, the forward link power control commands to be transmitted on the reverse link for the respective cases are illustrated.

In the following description, Table 1 is called a state checking table. The frame state judgment performed by the controller 26d with respect to all the cases illustrated in the state checking table will be explained later with reference to the flowchart of FIG. 12. In the state checking table, the terms "TH1" and "TH2" denotes threshold values of the respective comparators, but they are not necessarily the same as the first and second threshold values illustrated in FIG. 3.

Figure 5:
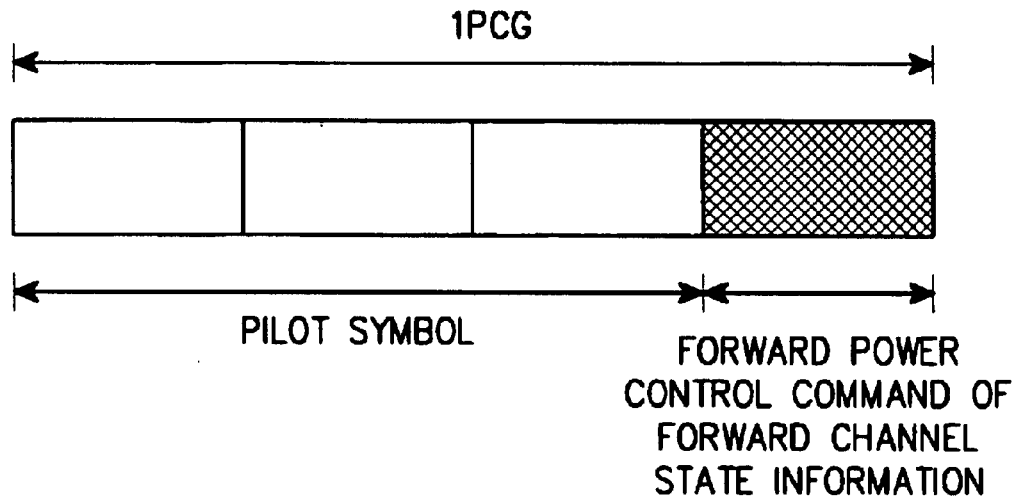
FIG. 5 is a view illustrating the structure of a frame of a reverse pilot symbol and a power control sub-channel for the forward power control according to the embodiment of the present invention of FIG. 3.

Using the state checking table, the controller 26d of FIG. 3 judges the channel state, and outputs the result of judgment to a channel information inserter 26e. The channel information inserter 26e repeatedly inserts the result into a portion of the pilot channel for the length of the PN code. The structure of the inserted frame is shown in FIG. 5. The information inserted into the channel may be one bit of information which represents either a sufficient receiving state or an insufficient receiving state, or two bits of information which represents the four states of good, bad, uncertain, and pass. Specifically, when the inserted information is the one-bit information, it is repeatedly inserted to match with the length of the frame. When the inserted information is the two-bit information, it is encoded and then inserted to match with the length of the frame. The construction and operation of the base station receiver for the respective cases will be explained with reference to FIG. 7.

The result of the judgment of the controller 26d and the repetition of the channel information inserter 26e is inputted to a multiplexer 26f as one input thereof. The other input of the multiplexer 26f is the information of the reverse pilot channel. The multiplexer 26f combines the two inputs as shown in FIG. 5, and outputs the combined signal to a reverse link transmitter 18. Thus, the information detected by the terminal is transmitted to the base station.

Figure 4:
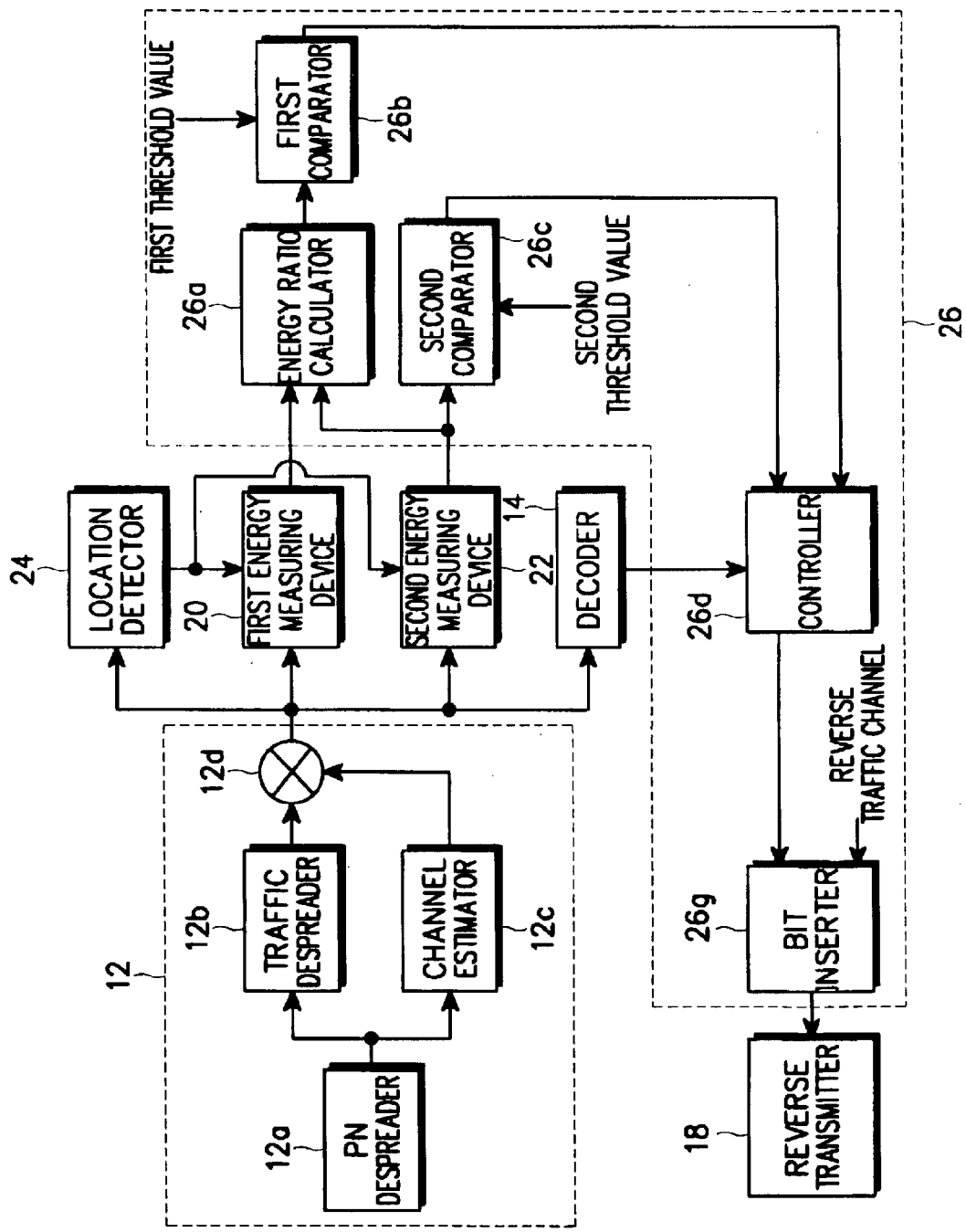
FIG. 4 is a block diagram illustrating the construction of a terminal which judges the state of a frame using information including information from the decoder of FIG. 2, according to another embodiment of the present invention.

FIG. 4 is a block diagram illustrating the construction of a terminal according to another embodiment of the present invention which includes the construction of the control section 26 of FIG. 2. The terminal determines the existence or nonexistence of a frame by obtaining the information from the decoder 14, and the ratio of the non-power control bit energy to the power control bit energy, and transmits the channel state on the reverse link. Referring to FIG. 4, the controller 26d judges the channel state in the same manner as that of FIG. 3. When the judged channel state is represented as one-bit information as described above, it can be inserted into a first bit of each traffic frame. When the judged channel state is represented as two-bit information as described above, it can be inserted into the first two bits of each traffic frame. The construction and operation of the base station receiver for the two cases will be explained later with reference to FIG. 8.

FIG. 5 is a view illustrating the structure of a frame of a reverse link pilot channel and a power control sub-channel for the forward link power control according to the embodiment of the present invention of FIG. 3. This frame structure is the same as the structure illustrated in RC (Radio Configuration) 3,4,5, and 6 of the IS-2000 standard. Referring to FIG. 5, three fourths of each power control group is for transmitting the reverse link pilot symbol, and the remaining one fourth is for transmitting the forward power control command. The channel state judgment value outputted from the controller 26d of FIG. 3 is transmitted through the forward power control sub-channel for transmitting the forward power control command. At this time, in transmitting the channel state judgment value, a one bit up or down command for controlling forward link transmission power may be repeatedly transmitted, or two bits representing the 4 states of the frame and channel may be encoded and transmitted. Specifically, in case of transmitting the one-bit command, the forward power control section of the base station controls forward power using this information. In case of transmitting the two-bit channel information, the forward power control section of the base station decodes this information, and controls the forward transmission power according to whether a previous frame has been transmitted. The construction and operation of the forward power control section of the base station will be explained with reference to FIG. 7.

Figure 6:
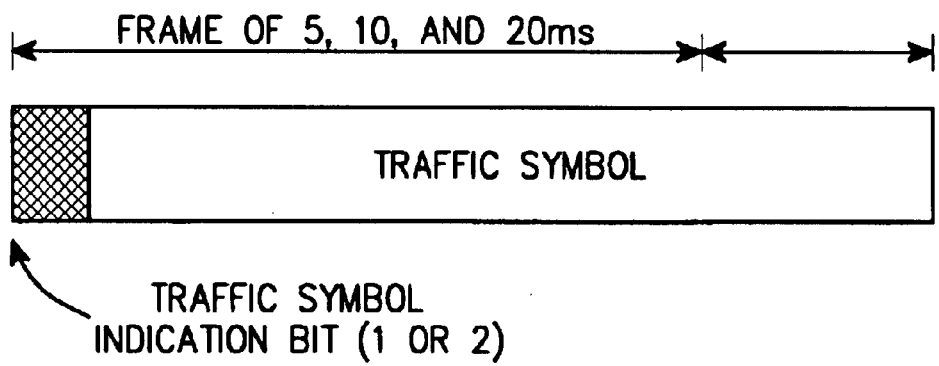
FIG. 6 is a view illustrating the structure of a reverse traffic transmission frame for the forward power control according to the embodiment of the present invention of FIG. 4.

FIG. 6 is a view illustrating the structure of a reverse link traffic transmission frame for forward power control according to another embodiment of the present invention of FIG. 4. Referring to FIG. 4, the output of the controller 26d is information indicating 4 possible states of the frame and channel. Using this information, the reverse link transmitter of the terminal can insert a frame state indication bit for representing the channel state into a front portion of the user data frame. Specifically, the reverse link transmitter of the terminal can transmit to the base station the one-bit information which is positioned on the front portion of the frame and which represents the two channel states of "good" and "bad". Also, the channel state can be transmitted to the base station as the two-bit information which represents 4 channel states. When the one-bit information is transmitted, the forward power control section of the base station decodes the data frame, analyzes the one-bit information, and performs forward power control using the one-bit information. When the two-bit information is transmitted, the forward power control section of the base station decodes the data frame, analyzes the two-bit information, and then performs forward power control depending on whether a previous frame was transmitted. The construction and operation of the forward power control section of the base station will be explained with reference to FIG. 7.

Figure 7:
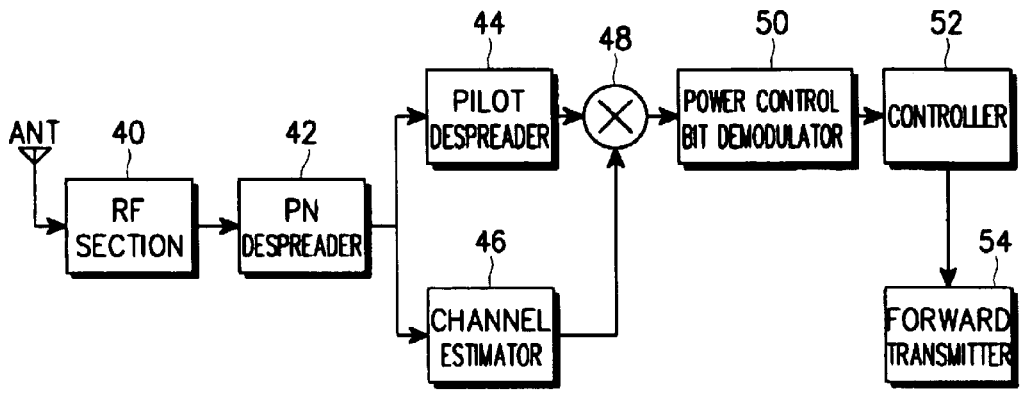
FIG. 7 is a block diagram illustrating the forward link power control apparatus of the base station for the reverse transmission forward link power control according to the embodiment of FIG. 5.

FIG. 7 is a block diagram illustrating the control system for controlling the forward link power of the forward link transmitter using the forward power control command according to the channel state of reverse link. The controller 52 controls the power transmitted on the forward link by means of the reverse link power control frame structure.

The base station receiver demodulates the received reverse link signal, analyzes the power control bits transmitted from the terminal to the base station, and controls the forward link transmission power. At this time, the demodulator (50 in FIG. 7) of the base station receiver extracts the power control information from the power control command inserted in the pilot channel as proposed in FIG. 5. As shown in FIG. 5, the transmitted power control information may be the power control command which the terminal transmits to control the forward link power, or may be the state information of the forward channel judged by the terminal. Accordingly, the two cases will be explained as method 1 and method 2.

According to method 1, the base station uses the power control command to make the forward link power go up or down according to the channel state checked by the terminal. Specifically, if the terminal divides the state of the received forward channel according to the method of FIGS. 3 and 5 into "good" and "bad", the base station makes the forward link transmitter power go up or down accordingly. The forward power controller of the base station demodulates this command, and controls the forward power.

On the contrary, according to the method 2, the base station controls the forward link power according to the transmission state of the previous frame with respect to the 4 channel states if the 4 channel states of "good", "bad", "uncertain", and "pass" as shown in FIGS. 3 and 5 are used to transmit forward link state information to the base station.

Method 1 is described in Table 2, and method 2 is described in Table 3 below.

In Table 2 (Method 1), the channel states of "uncertain" and "pass" are the results of internal judgment of the terminal, and the commands finally transmitted on the reverse link are the "down" and "up" commands.

The reason why the transmission channel state of the frame is shown in Table 2 is to indicate the difference between method 1 and method 2. Specifically, in Table 2 and Table 3, the case when the frame is "Y" and the channel state is "pass" is different from the case when the frame is "N" and the channel state is "good". In Table 2, the case when the frame is "Y" and the channel state is "pass" actually corresponds to the case when the CRC of the frame is "bad" and the quality is "sufficient", and, in this case, the terminal commands a "power down", while in Table 3, the terminal commands a "power up". That is because the base station knows that the frame exists and the CRC of the frame is "bad" since it knows whether the frame has been transmitted.

Similarly, in Table 2, in case that the frame is "N" and the channel state is "good", the frame has not been transmitted, the CRC is "good", and thus the power goes down. In Table 3, this case can be processed as "bad" since the base station knows that the frame has not been transmitted.

frame is transmitted, it is recognized that the data portion has been severely attenuated since the energy of the power control bits cannot pass the CRC checking though it exceeds the predetermined level, and the energy of the data portion is below the specified level. Thus, in this case, it is judged that the channel state is "bad", and it is determined to increase the power. Meanwhile, if the terminal judges the "good" frame state when the frame is not transmitted, it is recognized that the error occurs in the CRC checking of the decoder of the terminal, and thus the channel state is determined to be "bad" to determine the power increase. In case that the terminal having the construction of FIG. 3 transmits backward the channel state information according to the forward channel power as shown in FIG. 5, the receiver of the base station uses the apparatus constructed as shown in FIG. 7 to receive and process the channel state information. Specifically, if the data having the format of

TABLE 2

| Previous frame transmission | Y | | | | N | | | |
|---|---|---|---|---|---|---|---|---|
| Channel state of terminal | Good | Uncertain | Pass | Bad | Good | Uncertain | Pass | Bad |
| Quality of received signal | S | I | S | I | S | I | S | I |
| Power control result of Method 1 | Down | Up | Down | Up | Down | Up | Down | Up |

TABLE 3

| Previous frame transmission | Y | | | | N | | | |
|---|---|---|---|---|---|---|---|---|
| Channel state of terminal | Good | Uncertain | Pass | Bad | Good | Uncertain | Pass | Bad |
| Quality of received signal | S | I | S | I | S | I | S | I |
| Channel state of base station | S | I | I | I | I | I | S | I |
| Power control result of Method 2 | Down | Up | Up | Up | Up | Up | Down | Up |

In method 1, the terminal judges the four channel states of "good", "bad", "pass", and "uncertain", and then judges the two channel states of "S" and "I" to transmit "up" or "down" command to the base station. In method 2, the terminal judges the four channel states of "good", "bad", "pass", and "uncertain", and transmits the result of judgment to the base station, the base station judges "up" or "down" using the information on whether the previous frame has been transmitted.

The receiver of the terminal judges the state of the forward channel by the method proposed in FIG. 3. At this time, the channel state is divided into "good", "uncertain", "pass", and "bad". In method 1, the power control command transmitted on the reverse link forward power control issues an order of power down in the "good" or "pass" state, and issues an order of power up in the "uncertain" or "bad" frame state. In method 2, if the terminal transmits the state information of the judged channel to the base station, the power controller in the base station determines up and down of the forward power according to the received state information of the channel and the transmission state of the previous frame. Specifically, if a previous frame has been transmitted, the power down is effected only in the event that the channel state is "sufficient", and for the remaining three cases, the power up is effected. If a previous frame has not been transmitted, the power down is effected only when the state information of "pass" is received, and for the remaining three cases, the power up is effected.

According to the difference between method 1 and method 2, if the terminal judges the "pass" state when the FIG. 5 is transmitted through the pilot channel, an RF section 40 of the base station receives the data through an antenna. The received data is converted into a baseband signal, and then despread by a PN despreader 42. Thereafter, the transmitted data is extracted by a pilot despreader 44, and mixed with a channel estimation signal from a channel estimator 46 in a mixer 48. An output signal of the mixer 48 is demodulated by a demodulator 50, and then inputted to a controller 52. The controller 52 generates a signal for controlling the power using one of the methods of Table 2 and Table 3, and then performs forward link power control with respect to the terminal through a forward transmitter 54.

The forward power control method proposed as method 1 and method 2 according to the present invention performs power control for each frame in comparison to the conventional method which performs power control only when a frame is transmitted, using the CRC checking of the decoder, and thus, in the preferred embodiments of the invention, the channel variation state can be more efficiently pursued.

Figure 8:
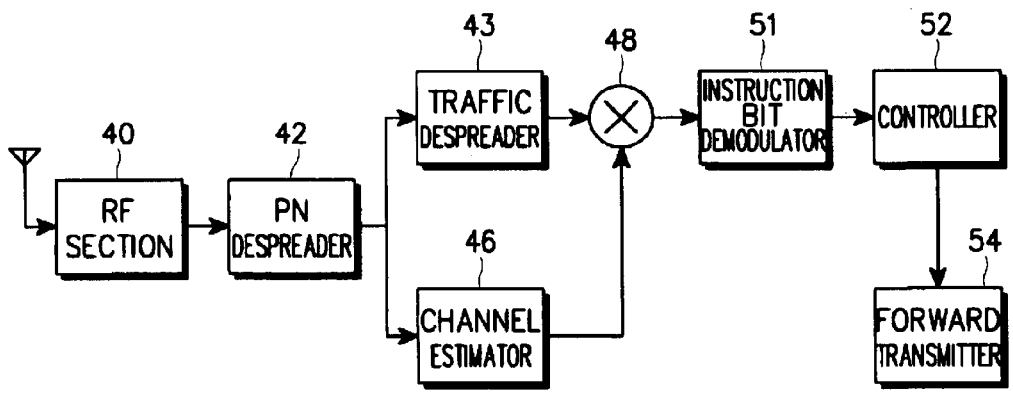
FIG. 8 is a block diagram illustrating the forward link power control apparatus of the base station for the reverse transmission forward link power control according to the embodiment of FIG. 6.

FIG. 8 is a block diagram illustrating the forward link power control apparatus of the base station for controlling the forward transmission power using the forward power control command according to the channel state in FIG. 2. The controller controls the power transmitted forward with respect to the reverse power control frame structure of FIG. 6.

The method according to FIG. 8 is a method of transmitting the forward channel information on a reverse link traffic channel as proposed in FIGS. 4 and 6. The channel state information may be one-bit information for judging the "good" and "bad" channel states, or two-bit information for judging the 4 possible channel states. In both cases, the channel information bits are inserted in a specified portion of each frame (in the embodiment of FIG. 6, the channel information bits are inserted onto the location of the first one or two bits of each frame, but, in other embodiments, the location of the channel information bits may be fixed or differently given to the respective users), and are transmitted on the reverse link.

In explaining the method according to FIG. 8, method 1 corresponds to the case that the terminal controls the forward power by judging the forward channel state as "good" or "bad", and the method 2 corresponds to the case that the terminal transmits on the reverse link the channel state information as "good", "uncertain", "pass", or "bad", and the forward power controller of the base station controls the power using the transmitted channel state information. The base station receiver analyzes the state information of the forward channel by demodulating the reverse link traffic channel. According to the method 1, if the state information is good, the forward power is increased, while if the state information is bad, the forward power is decreased.

According to the method 2, the forward power is controlled using the state information along with the information indicating whether the previous frame has been transmitted.

Also, the method according to FIG. 8 is different from that according to FIG. 7 in accordance with the format of the data transmitted from the terminal. The method according to FIG. 8 uses the data received from a traffic despreader 43 instead of the pilot despreader 44.

Hereinafter, explanation of the difference between method 1 and method 2 and the number of cases in the control method will be omitted since it is the same as that of Table 2 and Table 3 as explained in reference to FIG. 7. In the same manner as the method according to FIG. 7, the method proposed in FIG. 8 controls the forward link transmission power for each frame, and thus more rapidly and efficiently compensate for the variation of the channel in comparison to the conventional method of controlling the power only when the frame is transmitted.

Figure 9:
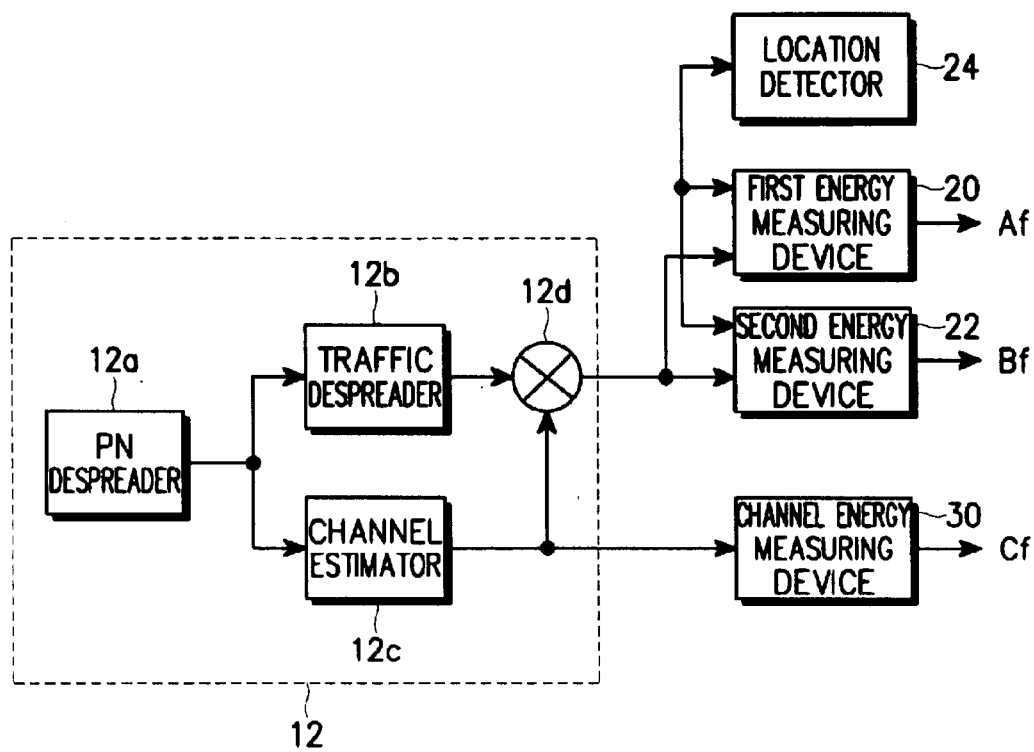
FIG. 9 is a block diagram illustrating the detailed construction of an apparatus for judging the existence or nonexistence of a frame by measuring the energy of the power control bits to the energy of the non-power control bits.

FIG. 9 is a block diagram illustrating the detailed construction of an apparatus for judging the state of the channel illustrated in FIGS. 3 and 4 in the forward power control apparatus capable of discontinuous transmission mode of FIG. 2. The construction and operation of the receiver 12 of FIG. 9 is the same as that of FIGS. 2 and 3, and explanation thereof will be omitted. The signal outputted from a mixer 12d of the receiver 12 is inputted to a second energy measuring device 22 for measuring the energy of the power control bits and a first energy measuring device 20 for measuring the energy of the non-power control bits. The output value of the first energy measuring device 20, the output value of the second energy measuring device 22, and the comparison of the value of the ratio thereof and a threshold value are given by the following equations 1, 2, and 3.

[Equation 1]

Non_PCB symbol energy:

$$\frac{E_{NON\_PCB}}{E_{PILOT}} = \sum_{frame} \frac{\left[\sum_{finger} D(t) \cdot P*(t)\right]^2}{\left[\sum_{finger} D(t) \cdot P*(t)\right]^2} = \sum_{frame} \frac{\left[\sum_{finger} Af\right]^2}{\left[\sum_{finger} Cf\right]^2} = \sum_{frame} \left\{\frac{A}{C}\right\}^2$$

[Equation 2]

PCB energy:

$$\frac{E_{PCB}}{E_{PILOT}} = \sum_{frame} \left\{\frac{\left[\sum_{finger} C(t) \cdot P*(t)\right]}{\left[\sum_{finger} C(t) \cdot C*(t)\right]}\right\}^2$$

$$= \sum_{frame} \left\{\frac{\left[\sum_{finger} Bf\right]}{\left[\sum_{finger} Cf\right]}\right\}^2 = \sum_{frame} \left\{\frac{B}{C}\right\}^2$$

[Equation 3]

$$\frac{E_{NON\_PCB}}{E_{PILOT}} = \frac{\sum_{frame}\left\{\frac{A}{C}\right\}^2}{\sum_{frame}\left\{\frac{B}{C}\right\}^2} \geq THRESHOLD$$

The values in the above equations are defined as follows:

$$A = \sum_{frame} Af$$

$$B = \sum_{frame} Bf$$

$$C = \sum_{frame} Cf$$

D(t): Traffic_symbol

D(t): PCB_symbol

D(t): Pilot_symbol

In Equation 1, if the numerator term that is the non-power control bit signal component where the channel state is compensated for is 'Af', and the denominator term which is the channel state measured by the channel energy measuring device 30 is 'Cf', they are implemented by the apparatus of FIG. 9.

In Equation 2, if the numerator term that is the power control bit signal component where the channel state is compensated for is 'Bf', the numerator term and the denominator term in Equation 2 are implemented by the apparatus of FIG. 9.

Equation 3 is an equation for obtaining the ratio of the non-power control bit energy to the power control bit energy obtained by the apparatus of FIG. 9, and determining whether the frame exists by comparing the obtained value with the given threshold value.

Figure 10:
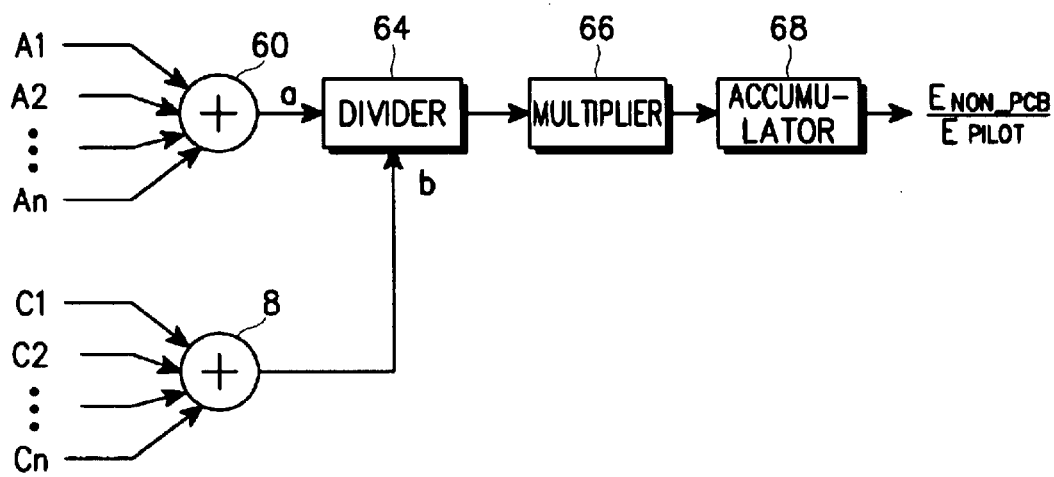
FIG. 10 is a block diagram illustrating the construction for obtaining the energy of the non-power control bits implementing the method according to the embodiment of FIG. 8.

FIG. 10 is a block diagram illustrating the construction for detecting the non-power control bit energy of Equation 1. Referring to FIG. 10, the operation of the construction implementing Equation 1 will be explained in detail.

The non-power control bit energy and the pilot energy measured at respective fingers are added together by first and second adder 60 and 62, and the added values are divided by a divider 64. The output of the divider 64 is A/C as in Equation 1. The output of the divider 64 is multiplied by a multiplier 66, and the multiplied value is accumulated over a predetermined period by an accumulator 68.

Figure 11:
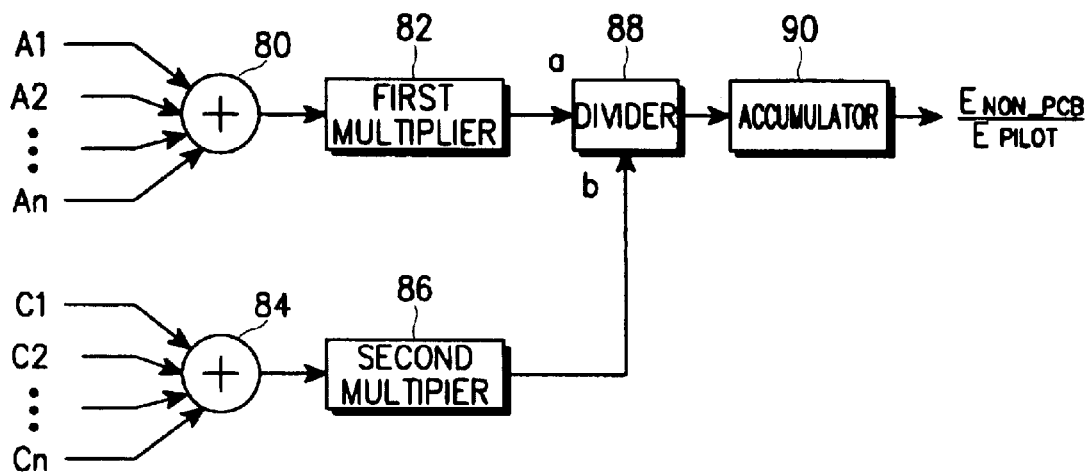
FIG. 11 is a block diagram illustrating the construction for obtaining the energy of the non-power control bits wherein the equation of FIG. 10 is changed.

The construction of FIG. 10 may be replaced by the construction of FIG. 11. Specifically, two adders 80 and 84 are identical to the adders 60 and 62 of FIG. 10, and an accumulator 90 is identical to the accumulator 68 of FIG. 10. However, the order of the division and the multiplication is different. Specifically, in FIG. 10, the division is first performed by the divider 64, and the multiplication is performed by the multiplier 66. In FIG. 11, the output of the first adder 80 is multiplied by the first multiplier 82, and the output of the second adder 84 is multiplied by the second multiplier 86. The output values are divided by the divider 88. Thus, by modifying Equation 1, the above construction can be implemented. However, the construction of FIG. 10 is simpler than that of FIG. 11. In other words, the construction may be changed according to the modification of Equation 1, and it will be apparent to the skilled in the art that other modifications are also possible.

Figure 12:
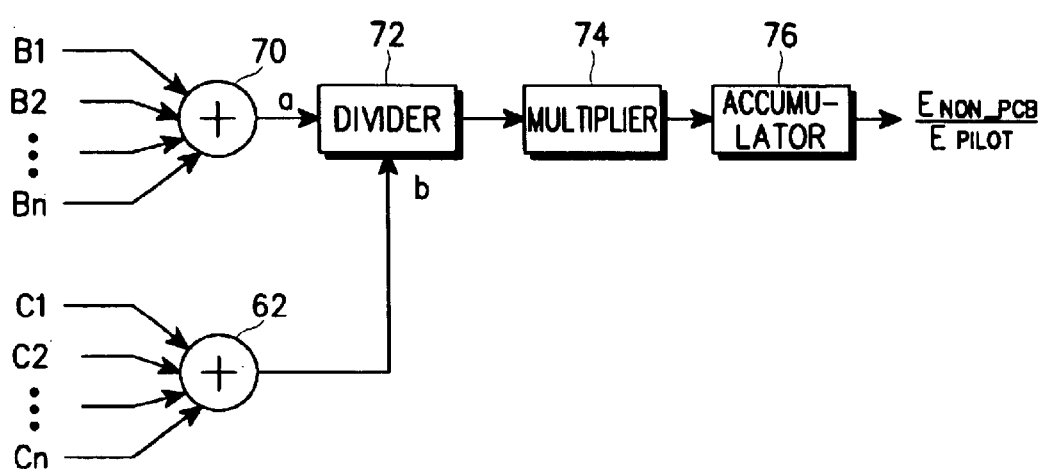
FIG. 12 is a block diagram illustrating the construction for obtaining the energy of the power control bits implementing the method according to the embodiment of FIG. 8.

FIG. 12 is a block diagram illustrating the construction for detecting the power control bit energy of Equation 2. Referring to FIG. 12, the operation of the construction implementing Equation 2 will be explained in detail.

The power control bit energy and the pilot energy measured at respective fingers are added together by first and second adder 70 and 72, and the added values are inputted to a divider 72. The divider 72 receives the two signals as its inputs, and divides the output of the first adder 70 by the output of the second adder 72. The output of the divider 72 is inputted to and multiplied by a multiplier 74. The output of the multiplier 74 is accumulated for a predetermined value by an accumulator 76.

The power control bit energy value calculated by the construction of FIG. 11 and the non-power control bit energy value calculated by the construction of FIG. 10 are processed by Equation 3 to obtain the value for judging whether a frame exists.

Figure 13:
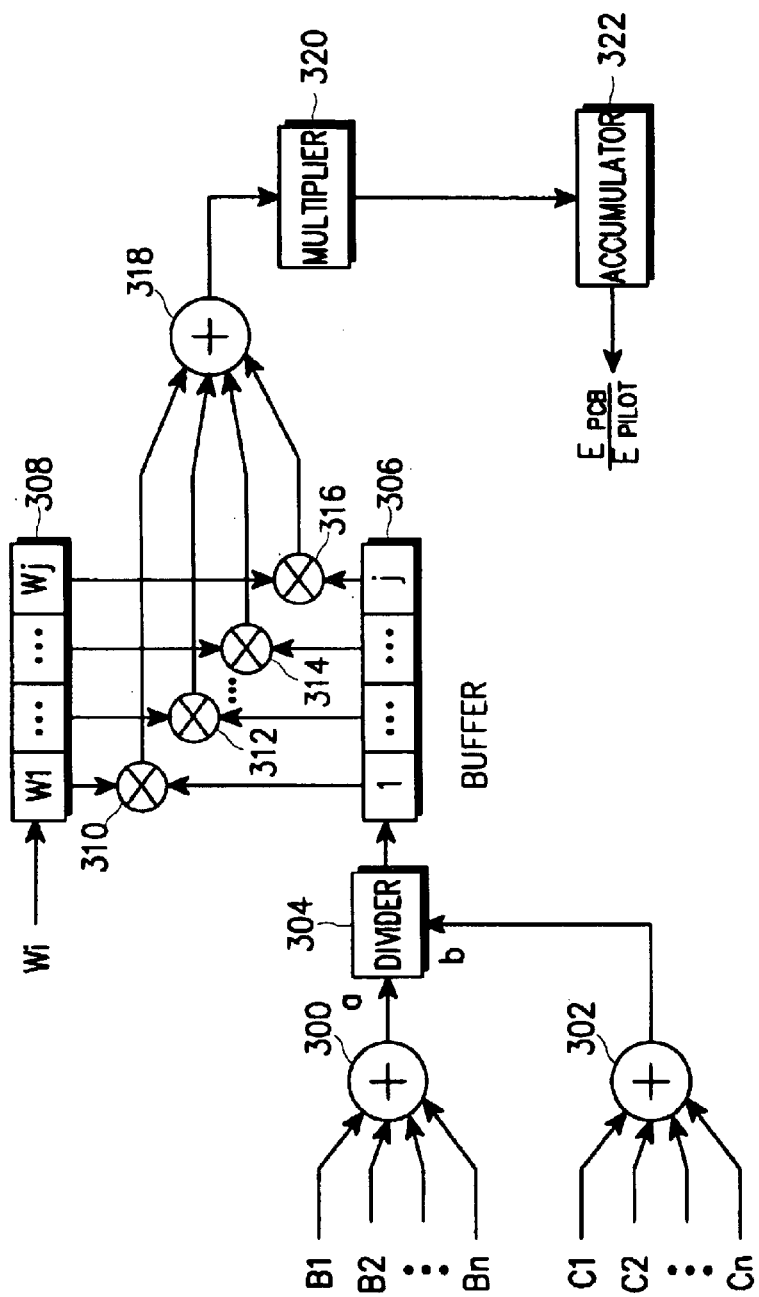
FIG. 13 is a block diagram illustrating another embodiment of the energy ratio calculator of FIGS. 3 and 4.

FIG. 13 is a block diagram illustrating another embodiment of the energy ratio calculator 26a of FIGS. 3 and 4. The construction of FIG. 13 is given by the following Equation 4, and by applying it to Equation 3, the following Equation 5 is obtained. [Equation 4]

PCB energy:

$$\frac{E_{PCB}}{E_{POLIT}} = \sum_{frame}\left\{\sum_{i}^{N} W_i \cdot \frac{\left[\sum_{finger} C(t) \cdot P_*(t)\right]}{\left[\sum_{finger} P(t) \cdot P_*(t)\right]}\right\}^2$$

$$= \sum_{frame}\left\{\sum_{i}^{N} W_i \cdot \frac{\left[\sum_{finger} Bf\right]}{\left[\sum_{finger} Cf\right]}\right\}^2 = \sum_{frame}\left\{\sum_{i}^{N} W_i \cdot \frac{B}{C}\right\}^2$$

[Equation 5]

$$\frac{E_{NON\_PCB}}{E_{PILOT}} = \frac{\sum_{frame}\left\{\frac{A}{C}\right\}^2}{\sum_{frame}\left\{\sum_{i}^{N} W_i \cdot \frac{B}{C}\right\}^2} \geq \text{THRESHOLD}$$

In Equation 4 and Equation 5, '$W_i$' denotes the forward power control command transmitted in the i-th power control group, i.e., the command transmitted on the reverse link for the forward power control by the base station after the forward channel state is measured by the terminal. By storing this value in a buffer, the state information of the channel is stored. If it is judged that the forward channel state is good, the forward channel control command transmitted on the reverse link lowers the forward power, and thus this value is recorded as '1'. In other words, the value stored in the buffer 308 is '1'. On the contrary, if it is judged that the forward channel state is not good, the forward channel control command transmitted on a reverse link heightens the forward power, and this value is recorded as '0' in the buffer 308. Accordingly, since the power control bit energy value of the power control group recorded as '1' represents the state that the channel state is good, it will be a compensation in calculating the current power control bit energy value. Also, since the power control bit energy value of the power control group recorded as '0' represents the state that the channel state is bad, it will not be a compensation in calculating the current power control bit energy value. If '$W_i$' is 1, the channel state is good, the decrease of the power is commanded, and thus −0.5 dB is reflected in the equation. If '$W_i$' is 0, the channel state is bad, the increase of the power is commanded, and thus +0.5 dB is reflected in the equation.

FIG. 14 is a flowchart explaining the operation of the controller in the embodiments of the present invention shown in FIGS. 3 and 4. The controller 26d checks whether the currently received frame is a good frame or a bad frame using decoding information such as the CRC checking of the decoder 14 at step 102. That is, the controller checks whether the decoding has been accurately performed, i.e. whether the CRC check indicates there is an error or not. If it is checked that the received frame is good as a result of CRC checking at step 102, the controller 26d proceeds to step 108. In this case, it is judged that the frame exists, and the frame state is good. However, If it is checked that the received frame is not good as a result of CRC checking at step 102, the controller 26d proceeds to step 104. At step 104, the controller 26d checks whether the power control bit energy value is larger than the predetermined threshold value by checking the power control bit energy. The power control bit energy includes the ratio value of the power control bit energy to noise. Specifically, the power control bit energy also corresponds to the signal strength ratio of the signal to the interference signal which represents the actual channel state as well as it simply means the energy of the power control bits. If the power control bit energy value is not greater than the predetermined threshold value as a result of checking, the controller 26d proceeds to step 110. On the other hand, if the power control bit energy value is greater than the threshold value, the controller 26d proceeds to step 106. In case of proceeding to step 110, the controller 26d considers that the currently received signal suffers from an inferior channel environment, and judges the "uncertain" state.

Meanwhile in case of proceeding from step 104 to step 106, the controller 26d judges the existence/nonexistence of the data frame. Specifically, the controller 26d compares the ratio value of the non-power control bit energy to the power control bit energy with the predetermined threshold value, and if the ratio value does not exceed the threshold value, it proceeds to step 112. At step 112, the controller judges the received signal as being in the "pass" state indicating that the channel environment is good, but no data frame exists. However, if the ratio value exceeds the threshold value, the controller 26d proceeds to step 114. At step 114, the controller judges the received signal as being in the "bad" frame state since the data frame exists, but the CRC checking result is not good.

As described above, according to the embodiments of the present invention, the power control bit energy and the non-power control bit energy of the received signal are measured in a mobile communication system which is capable of the discontinuous transmission mode, and an accurate channel state is detected even in the inferior channel environment using the above values and the data frame checking of the decoder, so that the power control can be performed for each frame even when the data frame is discontinuously transmitted. Hereinafter, the process of controlling the forward power performed in the base station using the result processed by the terminal will be explained.

Figure 15:
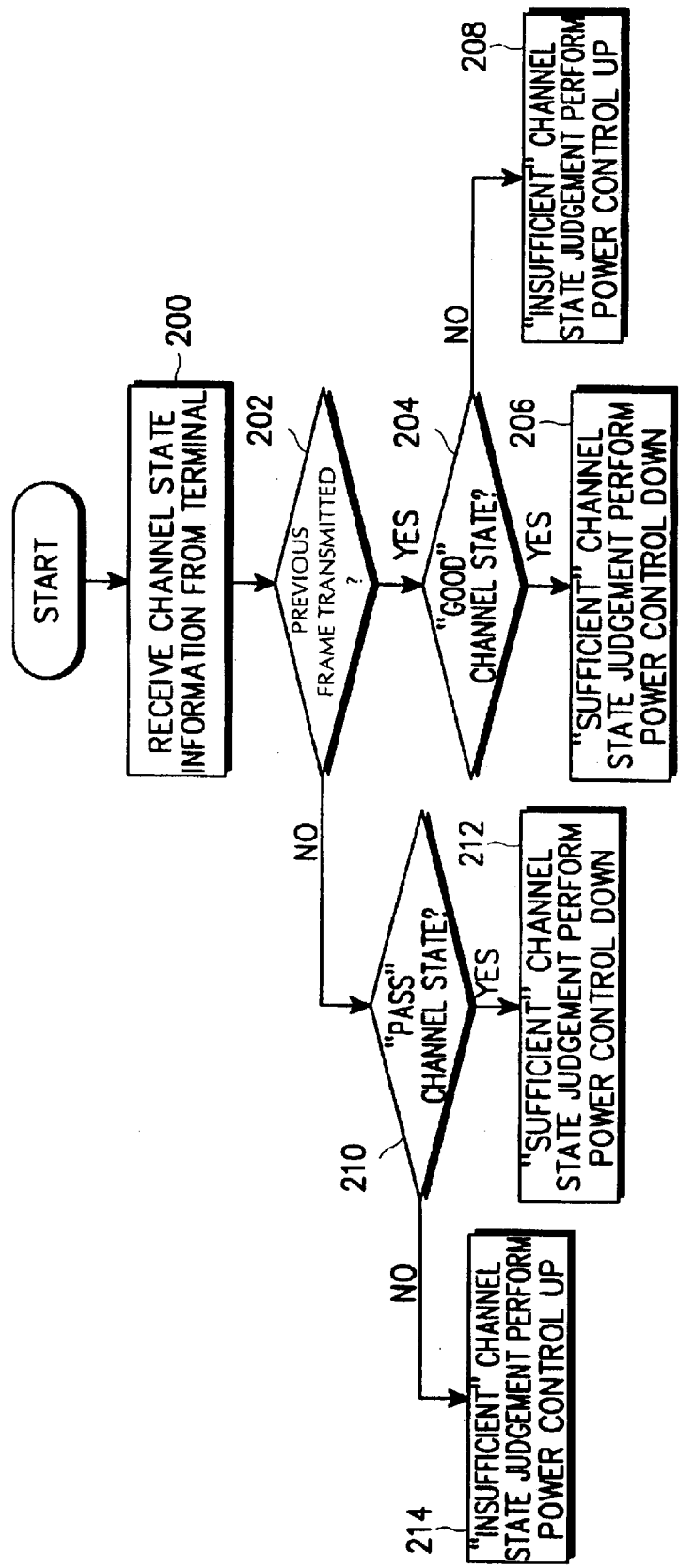
FIG. 15 is a flowchart explaining the operation of the controller according to the embodiments of the present invention of FIGS. 7 and 8.

FIG. 15 is a flowchart illustrating the forward power control process performed by the controller in case that the terminal judges the channel state through the process of FIG. 14, and transmits the corresponding data to the base station.

If the controller 52 of the base station receives the channel state information from the terminal at step 200, it proceeds to step 202. At step 202, the controller checks whether the previous frame has been transmitted. If the previous frame has been transmitted as a result of checking, the controller 52 of the base station proceeds to step 204, while if not, it proceeds to step 210. At step 204, the controller 52 checks whether the channel state information received at step 200 indicates the forward link is in a "good" state. If the received channel state information is in a "good" state, the controller 52 proceeds to step 206, while if not, it proceeds to step 208. The reason why the controller proceeds to step 206 or step 208 is that the forward link power is controlled to decrease only when the channel state is "good" when the previous frame has been transmitted as shown in Table 3. According to the power control result by method 2 in Table 3, the "power down" is effected only when the channel state is "good" when the frame is transmitted. Accordingly, at step 204, whether or not the channel state is "good" is checked. If it is "good" at step 204, the controller 52 of the base station transmits, at step 206, the command for making the forward power decrease to the forward transmission controller 54. Meanwhile, at step 208, the controller 52 of the base station transmits the command for making the forward power up to the forward transmission controller 54 to make the power of the base station up.

Meanwhile, if the channel information is received in a state that the previous frame has not been received in step 202, the controller 52 proceeds to step 210, and checks whether the channel state information is received in a "pass" state. If it is determined that the channel state is "pass", the controller 52 of the base station proceeds to step 212, and, if not, it proceeds to step 214. The reason why the controller proceeds to step 212 or step 214 is that the power is controlled to decrease only when the channel state is "pass" in case that the previous frame has not been transmitted as shown in Table 3. According to the power control result by method 2 in Table 3, the "power down" is effected only in case that the channel state is "pass" when the frame is not transmitted.

Accordingly, at step 210, whether or not the channel state is "pass" is checked. If the channel state is "pass", the controller 52 of the base station judges that the channel state is "sufficient" at step 212, and transmits the command for decreasing the forward link power to the forward transmission controller 54. On the contrary, if the channel state is not "pass" as a result of checking at step 210, the controller 52 proceeds to step 214. At step 214, the controller 52 judges that the channel state is "insufficient", and transmits the command for increasing the forward link power to the forward transmission controller 54 to making the forward transmission power of the base station up.

Also, according to the preferred embodiments of the present invention, when the terminal performs a soft handoff between base stations and the base stations increase the power control bit energy for reverse link power control, the terminal detects a handoff direction message (HDM) transmitted from the base station to the terminal, so that the terminal can recognize that the ratio of power control bits energy to noise is increased. During performing the handoff, the base station may or may not increase the energy of the power control bits. When the base station transmits the HDM informing the terminal whether the energy has been increased, the terminal can change the threshold value in case that the energy of the power control bits is increased. Accordingly, the accumulated power control bit energy is increased, and thus by adjusting the threshold value which is compared with the ratio of the non-power control bit energy to the power control bit energy, a proper control of the channel state can be obtained, resulting in forward link power control being effectively performed.

Also, according to the preferred embodiments of the present invention, even when transmission of the frame and the power control bits is performed in a gated mode, the transmission state of the frame can be accurately judged by changing the accumulated period of the channel estimator, the accumulated period of the power control bits and the non-power control bits, and the size of the threshold value. Specifically, if the frame is transmitted in the gated mode, the accumulated period is changed to 1, ½, and ¼ according to a gating rate, whereby the accumulated energy of the power control bits is reduced. Thus, by properly adjusting the threshold value, the channel state can be properly judged, and thus an effective forward power control can be achieved.

While this invention has been described in connection with what is presently considered to be the most practical and preferred embodiments, it is to be understood that other modifications thereof may be made without departing from the scope of the invention. Thus, the invention should not be limited to the disclosed embodiment, but should be defined by the scope of the appended claims and their equivalents.

What is claimed is:

1. A method of controlling forward link transmission power in a mobile communication system capable of discontinuous transmission mode, where a terminal generates a power control command for controlling the forward link transmission power, the method comprising:

a first step of determining whether an energy of power control bits of a received frame is more than a first threshold value, said first threshold value determined as a minimum value for receiving data;

a second step of determining that a channel state is good if the first step determines that the energy of the power control bits is more than the first threshold value;

a third step of determining that the channel state is bad if the first step determines that the energy of the power control bits is less than the first threshold value;

a fourth step of determining whether data decoded prior to the first step has been correctly decoded if the received frame includes cyclic redundancy check (CRC) information;

a fifth step of determining that the frame is good if it is determined that the data has been correctly decoded at the fourth step, or performing the first step if it is determined that the data has not been correctly decoded;

a sixth step of determining, if it is determined that the channel state is good, that the frame has no data if a divided value is less than a predetermined second threshold value, said divided value obtained by dividing an energy value of non-power control bits by an energy value of power control bits; and a seventh step of determining that the frame is bad if the divided value is more than the predetermined second threshold value.

2. An apparatus for detecting whether data exists in a received signal when in discontinuous transmission mode, and for transmitting a result of detection as a power control command, the apparatus comprising:

a location detector for detecting a location of energy of power control bits and a location of energy of non-power control bits of the received data;

a first energy measuring device for measuring energy of a signal corresponding to the location of the non-power control bits outputted from the location detector and for outputting said measure;

a second energy measuring device for measuring energy of a signal corresponding to the location of the power control bits outputted from the location detector and for outputting said measure; and a control section for determining whether data exists in the received signal by calculating a ratio of the output of the first energy measuring device to the output of the second energy measuring device, and for generating a power control command according to a determination; and a transmitter for transmitting the power control command, the transmitter including a channel information inserter for transmitting the detected data state information as the power control command, a multiplexer for multiplexing the data outputted from the channel information inserter with reverse link pilot channels, and a reverse link transmitter for converting an output of the multiplexer into a transmission signal to transmit the transmission signal.

3. The apparatus as claimed in claim 2, further comprising:

a decoder for performing a cyclic redundancy check (CRC) when the transmitted data includes CRC information;

wherein the control section determines whether data exists in the received signal using a value of the CRC state.

4. The apparatus as claimed in claim 2, wherein the control section comprises:

an energy ratio calculator for calculating a ratio of the measured energy value output of the first energy measuring device to an measured energy value output of the second energy measuring device and for outputting said measured energy ratio;

a first comparator for comparing the output measured energy ratio of the energy ratio calculator with a predetermined threshold value, said predetermined threshold value determined according to the existence or nonexistence of data; and a controller for detecting whether data exists in the received signal according to the output of the first comparator.

5. The apparatus as claimed in claim 4, wherein the control section further comprises:

a decoder for performing a cyclic redundancy check (CRC) if CRC information is included in the received data;

wherein the controller detects whether data exists in the received signal according to an output of the decoder and the output of the first comparator.

6. The apparatus as claimed in claim 5, wherein the control section further comprises:

a second comparator for comparing, if data exists, an accumulated energy value of the power control bits with a minimum threshold value;

wherein the control section detects whether data exists in the received signal according to the CRC state value, the output of the first comparator, and an output of the second comparator.

7. The apparatus as claimed in claim 6, wherein the transmitter comprises:

a bit inserter for transmitting the power control command along with traffic data; and a reverse link transmitter for multiplexing the data outputted from the bit inserter with reverse link channels and for transmitting a multiplexed signal.

8. The apparatus as claimed in claim 7, wherein the transmitted power control command comprises one bit representing two receiving states of "sufficient" and "insufficient".

9. The apparatus as claimed in claim 7, wherein the transmitted power control command comprises two bits representing four frame states of "good", "uncertain", "pass", and "bad".

10. The apparatus as claimed in claim 2, wherein the transmitted power control command comprises one bit representing two receiving states of "sufficient" and "insufficient".

11. The apparatus as claimed in claim 2, wherein the transmitted power control command comprises two bits representing four frame states of "good", "uncertain", "pass", and "bad".

* * * * *